No. 892,347.

PATENTED JUNE 30, 1908.

G. W. WRIGHT.
LOCK BOLT.
APPLICATION FILED SEPT. 12, 1907.

Granville W. Wright, Inventor

Witnesses

By Attorney

UNITED STATES PATENT OFFICE.

GRANVILLE W. WRIGHT, OF READING, PENNSYLVANIA, ASSIGNOR TO READING HARDWARE COMPANY, OF READING, PENNSYLVANIA, A CORPORATION OF PENNSYLVANIA.

LOCK-BOLT.

No. 892,347.  Specification of Letters Patent.  Patented June 30, 1908.

Application filed September 12, 1907. Serial No. 392,453.

*To all whom it may concern:*

Be it known that I, GRANVILLE W. WRIGHT, citizen of the United States, residing at Reading, in the county of Berks and State of Pennsylvania, have invented certain new and useful Improvements in Lock-Bolts, of which the following is a specification.

This invention relates to improvements in lock bolts and the object of the present invention is to provide a lock bolt which may be thrown easily, no matter what position it has been placed in with relation to the operating parts of the lock and particularly so as to the cam arm adapted to work in conjunction with said bolt. Heretofore lock bolts of this class have been made in a single piece and with the usual abutment for the cam arm. With this construction it is necessary for the cam to remain in the cam-recess or for the bolt to be in such a position that the cam can enter the cam-recess. It frequently happens that the bolt is thrown only a portion of its normal travel and is stopped in such a position that the cam cannot enter the cam-recess. This may occur if the bolt is moved by means of a thumb-knob and the same is carelessly operated, or if the bolt strikes the edge of the lock-casing. Again the bolt may be placed in this position with the cam out of the cam-recess by the careless assembling of the lock. In such cases the bolt could not be operated by the key because the cam arm would contact with the upper surface of the bolt instead of entering the depression therefor and engaging the abutment.

In my present construction I have made the bolt with a pivotally movable member, which, should the bolt be only partly thrown, will, when the cam contacts therewith, depress and permit the said cam arm to engage the bolt abutment and thus allow its proper operation.

Figure 1:
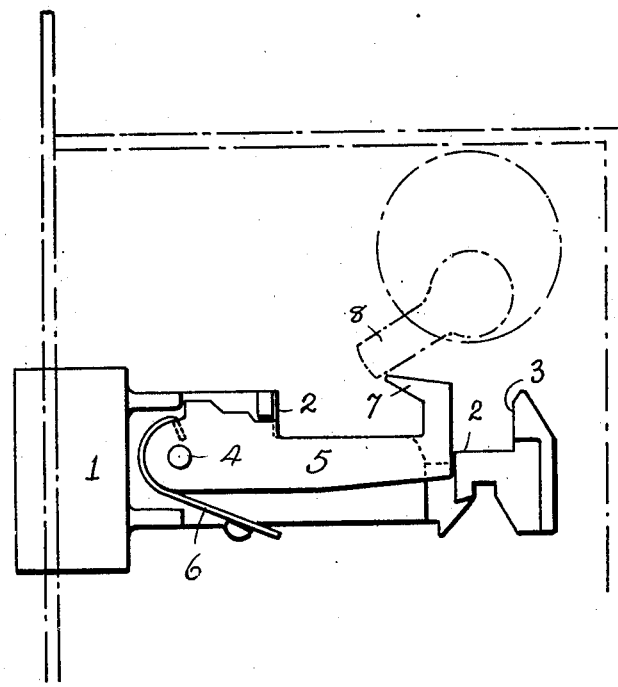
Figure 2:
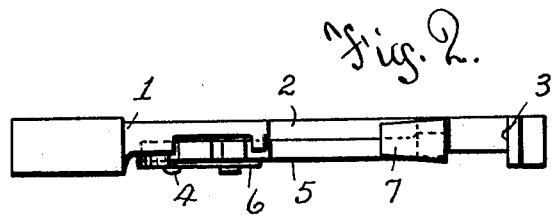

The invention is more fully described in the following specification and clearly illustrated in the accompanying drawing, in which Figure 1 is a side view and Fig. 2 a plan view of my improved bolt.

The numeral 1 designates the bolt. This bolt is substantially of ordinary outline, with the exception that its upper surface is cut away at 2 for approximately one half of its length. The usual abutment 3 is provided at the inner extremity of the bolt for engagement by the cam arm.

On the face of the bolt I provide a pin 4 and on this pin I place a lever 5. This lever is backed by a spring 6 which tends to keep it in normal raised position. The free inner end of the lever 5 or movable member of the bolt is adjacent to the cam-recess and constitutes a wall thereof. It may be formed with an angled projecting lip or lug 7, which I have shown having one portion projecting perpendicularly from the body of the lever and then turned at a slight angle away from the cam-recess, although this exact construction is not essential. It will also be obvious that the lug 5 may also have another lug projecting therefrom to form the other wall of the cam-recess in place of the abutment 3.

When the cylinder is operated by the key, the cam arm 8 in its revolution will normally engage the abutment on the end of the bolt. But when the bolt has been thrown out as in the act of locking the door, and it has for any reason whatever not traveled its full distance or throw, the revolving cam arm will contact with and depress the lip 7 on the lever 5, thus permitting it to enter the recess and continue its movement until it meets the abutment on the bolt, when its further operation will throw the bolt properly.

It will be seen that with this construction of bolt, no matter what position the bolt may be in, the cam arm will always be permitted to engage the abutment thereon and operate the bolt properly.

Having thus fully described my invention what I claim and desire to secure by Letters Patent is:—

1. In a lock bolt, a body portion having a cam-recess at its inner end and a spring backed movable member pivotally mounted to the face thereof, said movable member having a portion constituting a wall of the cam-recess.

2. In a bolt for door locks, a body portion having a cam recess at its inner end, a movable member pivotally mounted on said body portion and having its inner end adjacent to and at one side of said cam-recess, a spring adapted to keep said movable member in normal raised position, and a lip or lug formed on the free end of said movable member adapted to be engaged and depressed by the cam arm.

3. In a lock bolt a body portion having a cam-recess and an abutment at its inner end and a spring backed member movably mounted on the face thereof having its inner end adjacent to and at one side of said recess, said movable member having a lip or lug formed on the free end thereof.

4. In a bolt for door locks, a body portion having a cam-recess and an abutment at its inner end and a movable member mounted on said body portion, a spring adapted to keep said movable member in normal raised position, and an angled lip or lug formed on the free end of said movable member adapted to be engaged and depressed by the cam arm.

In testimony whereof I affix my signature, in presence of two witnesses.

GRANVILLE W. WRIGHT.

Witnesses:
ED. A. KELLY,
J. O'R. KELLY.